Nov. 13, 1962    H. PALMOUR III    3,063,144
METAL-TO-CERAMIC SEALS
Filed April 16, 1956

INVENTOR
HAYNE PALMOUR, III
Carpenter, Abbott, Coulter & Kinney
ATTORNEYS

United States Patent Office 3,063,144
Patented Nov. 13, 1962

3,063,144
METAL-TO-CERAMIC SEALS
Hayne Palmour III, Signal Mountain, Tenn., assignor to American Lava Corporation, Chattanooga, Tenn., a corporation of Tennessee
Filed Apr. 16, 1956, Ser. No. 578,489
3 Claims. (Cl. 29—473.1)

This invention relates to an improved process and composition useful in sealing metals to ceramics. More particularly, this invention relates to a process of making mechanically strong gas-impermeable hermetic seals between metals and refractory ceramics. The preferred embodiment of my invention is directed to a process for making sealed metal-to-ceramic components in the form of terminals, envelopes, etc., for electrical and/or mechanical use at elevated temperatures.

The seals provided by my process are structurally strong and are highly resistant to hermetic rupture even under such high stress conditions as encountered in vacuum apparatus operating at greatly elevated temperatures. They are resistant to severe thermal shock.

One of the essential features of my process involves coating a mixture of a particular non-carbonizing polymeric organic binder and an active metal ingredient, as described more fully hereinafter, upon a suitably cleaned limited area of a ceramic article where a sealing joint with metal is to be formed. By using coating ingredients and by firing under conditions as hereinafter set forth, I have been able to make hermetically strong seals in a mass production manner, with remarkably few rejects as compared to other processes for preparing the same. Very fine definition of the area of a ceramic article to be joined with metal is achieved by following my process.

Illustrative structures to which my invention appertains are set forth in the drawings, wherein.

Figure 1:
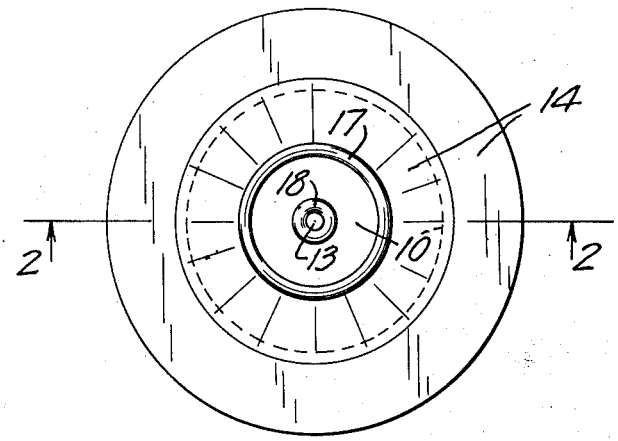
FIGURE 1 is a top view of assembled elements of an electrical terminal.
Figure 2:
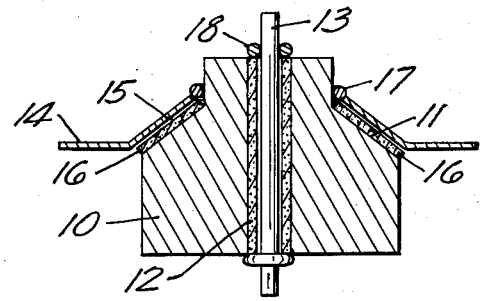
FIGURE 2 is a cross section through lines 2—2 of FIGURE 1.

Referring to FIGURES 1 and 2, the preferred embodiment of my process will now be described in the form of a specific but non-limitative example.

A previously fired and cleaned, shaped alumina ceramic 10 was uniformly coated on shoulder 11 and inside bore 12 with a coatable mixture of a powdered active metal suspended in a temporary volatilizable organic carrier consisting of a volatile organic solvent and a polymeric organic binder of certain characteristics to be described. The mixture used contained about 100 parts of powdered titanium as the active metal, about 25 parts of toluene and about 4 parts of cellosolve acetate as the volatile organic solvent, and about 2 parts of methyl methacrylate resin as the binder. The parts given for each component are only approximate, and should be adjusted in practice according to principles hereinafter elucidated. The mixture was painted on the aforenoted surfaces by brushing, a rotary brush being used to coat inside of bore 12.

While the coated mass was still tacky and yielding, metal pin 13, a low-expansion refractory alloy of iron, nickel, and cobalt, was fitted into bore 12 and metal piece 14 of like alloy was fitted over coated shoulder 11. A ring 17 of brazing metal, consisting of an alloy of 72 parts silver and 28 parts copper having a fluidus or initial fluidizing temperature at about 780° C., was then rested at the juncture of painted shoulder 11 and piece 14, as illustrated in the drawings, and a similar ring 18 rested at the juncture of pin 13 and coated bore 12 of ceramic article 10.

During the fitting of metal pin 13, metal piece 14, and the positioning of rings 17 and 18, toluene and cellosolve acetate were allowed to evaporate from the painted surfaces leaving about a one mil dry thickness for the coatings.

The assembled elements with the coatings dry were then transferred to a vacuum furnace chamber, which was rapidly evacuated to a pressure of about $1 \times 10^{-4}$ mm. of Hg, and maintained at a pressure less than about $5 \times 10^{-4}$ mm. of Hg during the following firing cycle. The temperature of the assembled elements first was raised gradually from room temperature to about 700° C. in about 15 to 20 minutes. The peak temperature of about 900–950° C. was reached rapidly thereafter and was maintained for about 10 minutes, after which the temperature was gradually lowered to room temperature over a period of time of about one hour.

The peak temperature reached was approximately 100 to 300° C. above the liquidus temperature of the used brazing metal rings. At the peak temperature, the brazing material melted and flowed into the joints between metal pieces 13 and 14, and ceramic 10 as a result of capillary and gravitational forces, filling the joints and spreading in a generally uniform manner over, and according to, the area of the ceramic painted with titanium metal.

From a theoretical standpoint, the active titanium metal component, during the above described firing in the substantial absence of oxygen, nitrogen, carbon, or other contaminants, apparently passed at least partially into solution with the molten brazing material and, in addition, functioned to form a strong, hermetic, chemical-type bond between metal and ceramic by extracting oxygen from oxides of the ceramic. It thus created in the bond of the finished product a series of solid solutions (layer upon layer through the bond), from metal, metal alloys, through suboxides of metal, e.g., titanium suboxides, to metal oxides, e.g., those forming the ceramic.

The presence of carbonaceous contaminants, or of nitrogen or oxygen in the surrounding atmosphere during the above described firing at elevated temperatures is to be avoided. If present, they cause deactivation of the active metal, forming carbides, nitrides, or oxides of such a metal, thus diminishing or even eliminating the desired bonding reaction of metal to ceramic.

However, even though a polymeric organic binder is employed in my process, mechanically strong hermetic seals are formed. The seals formed according to the illustrated preferred embodiment described above showed a leak rate, when tested on a helium mass spectrometer, of less than 0.0004 micron-cubic foot per hour (i.e., they allowed a pressure rise of less than 0.0004 micron of Hg in a one cubic foot evacuated container after one hour), indicating that they could be classed as gas-impermeable for the electronics industry.

Apparently, during the initial raising of temperature up to about 350–400° C., the polymethyl methacrylate resin binder depolymerized into volatile monomers which readily volatilized under the vacuum conditions employed. Then essentially all of the volatile components of the depolymerized binder were removed from the vacuum chamber by the vacuum pumps prior to further breakdown, such as that which might occur under the peak temperature conditions. As the temperature continued to rise, absorbed gaseous impurities in the assembled elements escaped, and were removed to maintain non-oxidizing vacuum conditions in the furnace. Up to about 700° C. absorbed gases and moisture escape and must rapidly be removed from the furnace in order to maintain the vacuum below a pressure of about $5 \times 10^{-4}$ mm. of Hg, and preferably below about $1 \times 10^{-4}$ mm. of Hg.

Ceramic articles for making hermetically strong seals according to my invention are fired dense or vitreous refractory bodies generally formed from such material, as for example, steatite, zircon porcelain, forsterite, alumina porcelain, sintered alumina, synthetic single crystal sapphire, etc. However, the essential features of my process may be used to bond various brazing metals to non-vitreous or porous ceramic bodies, if desired.

The surface area of a ceramic to which metal is to be bonded must be clean and free of grease, finger marks, etc. Suitable cleaning is accomplished by washing the fired ceramic with acetone or other cleaning solvent, followed by firing the ceramic in an oxidizing atmosphere at about 1000° C. Thereafter, the cleaned ceramic article is handled only with tweezers or other means designed to keep it clean and free of grease. Glazes are generally avoided on surfaces to which a sealing joint is to be effected. If glaze is used on other portions of the ceramic, it must be stable and refractory at the temperature at which the selected brazing material melts and forms a bond.

Instead of using powdered titanium as the active metal component in my coatable mixture, it is possible to use, if desired, other powdered known active metals such as zirconium, hafnium, vanadium, tantalum, molybdenum or tungsten, singly or in combination with each other, but perferably in combination wth at least a portion of powdered titanium.

For best results the active metal in my coatable mixture should be as pure as possible and preferably in a particle size smaller than approximately 325 mesh. Powdered active metals may be prepared as a suspension by such shearing or rubbing action typically found in an automatic mortar or colloid mill, using a volatile temporary organic solvent to protect the active metal from oxidation or deactivation. Various volatile temporary organic solvents such as, for example, toluene, cellosolve acetate, acetone, amyl acetate, methyl ethyl ketone, etc., are suitable to use.

Polymethyl methacrylate is the preferred polymeric organic binder component of my coatable mixture. It bonds metal powder to the ceramic and protects the active metal from oxidation or other deactivation during preliminary steps in my process. Further, it depolymerizes into volatile components, e.g., monomers at elevated temperatures without carbonization even in non-oxidizing atmospheres. The deploymerized binder volatilizes and escapes from the area where a metal seal to ceramic is to be effected. Other such polymeric organic resin binders which break down into volatile monomers without carbonization in a non-oxidizing atmosphere are for example, certain varnish resins and methacrylate acid esters such as isobutyl methacrylate, normal butyl methacrylate, etc.

Polymeric binders of the type above should be added to the finely ground active metal powder in an amount between approximately one and five percent by weight, based on the weight of the active metal powder. Enough volatile organic solvent, such as, for example, toluene, acetone, amyl acetate, etc., is used in the mixture to provide a brushable or sprayable mix capable of being kept in suspension with slight agitation and possessing firm adherence and favorable drying characteristics when applied to the ceramic.

The mixture should coated on the ceramic in a smooth uniform layer over areas to be sealed to a brazing metal. After the volatile organic solvent evaporates from the coating, the latter should be at a thickness between about 0.0005" and 0.002".

Suitably designed metal parts to be joined to the ceramic generally are of thin walled construction, ranging from about .005" to .025" in thickness . The melting point or liquidus temperature of these metal parts is well above the temperature reached in the process for he brazing action. Areas of these parts are juxtaposed in capillary relationship to active metal coated areas of the ceramic. For example, in FIGURE 2, the underside surface 15 of the flange of piece 14 rests on painted coating 16 with only a minute irregular capillary space therebetween. Likewise pin 13 inside bore 12 leaves but an irregular capillary space between the coated surface of the ceramic and the surface of the pin. The maximum capillary clearances in the sealing zone are generally no greater than about .002" but may be as great as about .005", or even greater for some purposes.

Brazing metal in the form of rings, washers, etc., is positioned in relationship to the active metal coated area of the ceramic so that upon melting, the brazing material will contact and bond to the active metal coated ceramic surface. Preferably at least a portion of the active metal coated surface is in contact with the pre-positioned ring of brazing metal. On melting, the brazing material contacts the active metal coating and the adjacent juxtaposed metal piece, and consequently flows into the capillary gap and completes the seal.

Brazing metals for my process generally contain, for example, at least some silver, copper, gold or nickel, as well as, in some cases, a metal such as chromium, tin, indium, etc. Various alloy mixtures of the foregoing metals are also useful. Brazing metals which melt at any suitable temperature may be used in the process, but those having liquidus or initial fluidizing temperatures between approximately 650° C. and 1400° C., preferably between 650° C. and 1150° C., are most useful. When completely melted, these metals flow readily over ceramic surfaces coated with an active metal, adhering to such surfaces according to the pattern of the coated active metal. Metals which are readily volatilizable or which are vaporized in vacuum atmospheres at brazing temperatures are to be avoided as brazing constituents.

As is well understood in the art, ceramic articles and metal pieces between which a brazed joint is to be formed should be selected with attention to thermal expansion coefficients, expansion convolutions and configurations, etc. Stresses should be so distributed in the finished article that tensile failure of the ceramic upon cooling due to expansion mismatch is avoided.

The vacuum furnace chamber for brazing should be suitably equipped to provide a vacuum environment having a pressure less than about $5 \times 10^{-4}$ mm. of Hg, during all stages of high temperature firing. An oil diffusion pump in combination with a mechanical pumping system and suitable valves, baffles and shields to prevent backstreaming of diffusion pump fluids into the furnace chamber or other heated portions of the system may be used. Assembled elements are jigged in the vacuum furnace chamber using highly refractory materials preferably free of objectionable gassing or vaporizing characteristics. Such materials are dense alumina, 310 stainless steel, etc. Heating of the assembled parts may be accomplished by radiation from electrical heating elements in the chamber. For example, resistance windings of molybdenum, tungsten or other highly refractory metals are suitable to employ for heating.

Firing is generally conducted on a cycle allowing about 15–20 minutes from room to a peak brazing temperature generally about 100 to 300° C. above the initial fluidizing or liquidus temperature of the brazing metal employed. The peak temperature is maintained for from 2 to about 20 minutes, after which cooling to approximately room temperature is controlled over a period of about 30 minutes to 2 hours in order to prevent excessive stresses from developing. The sealed article may be removed from non-oxidizing vacuum conditions at any time after the temperature has dropped to about 300° C. or lower.

My process is also useful for providing ceramic components with a layer of brazing metal bonded thereto. To the resulting layer of brazing metal on the ceramic, metal pieces can be soldered or brazed under standard atmospheric conditions using well known brazing or soldering materials.

Figure 3:
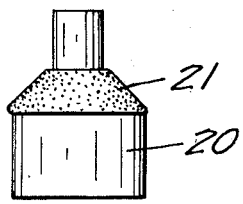
FIGURE 3 is a side view of a ceramic article coated with a metal containing layer.

In this embodiment, illustrated in FIGURE 3, a refracory ceramic article 20 is uniformly coated on shoulder 21 with a uniform mixture of powdered active metal and powdered brazing metal suspended in a volatile temporary organic carrier such as described above, containing a volatile organic solvent and a polymeric organic binder. Based upon 100 parts total for the powdered metals suspended in this mixture, the powdered active metal component will generally account for about 5 to 15 parts and the powdered brazing metal will account for about 85 to 95 parts, but larger or smaller proportions may be used, if desired. The metal components should be pulverized to a particle size below approximately 325 mesh.

Between about 1 and 5 percent by weight, based on the total weight of powdered metal, of polymeric organic binder is added to this powdered metal mixture. Sufficient organic solvent is added to provide a brushable or sprayable mix possessing firm adhearing characteristics when applied to the ceramic, and so that the powdered metal components of the mix are capable of being kept in suspension by slight agitation. The suspension in this embodiment is coated so as to provide a coating thickness of between about .001″ and .005″ after the volatile organic solvent evaporates.

Firing of this painted ceramic is conducted on the same general cycle and under conditions such as described for the preferred embodiment of my process. On initial heating, the polymeric binder depolymerizes and the volatile componets are removed from the system. At the peak temperature, the powdered brazing metal melts and flows into intimate contact with the titanium on the coated surface, alloying with at least part of it, and wetting the ceramic in the area of the coating by virtue of the action of the active metal. A strong hermetic bond results upon cooling. Thereafter, a metal piece can be joined to the layer of brazing material on the ceramic article by, for example, using torch brazing techniques and silver solders melting below about 700° C., provided of course that proper precautions are taken to avoid excessive heating rates on the metallized ceramic and to avoid strongly oxidizing flames which might render the coating unbrazeable.

Components manufactured by my process are particularly suitable for use as electrical terminals in vacuum apparatus, where structurally strong hermetic seals are needed. They may be installed in such apparatus using known techniques and materials.

The practical success of my process is to a large extent attributable to the peculair characteristics of the coating composition employed. The polymeric organic binder in this composition serves to bond suspended powdered active metal to the ceramic, to protect the metal from oxidation during preliminary processing; and yet, under the vacuum conditions employed in processing, it does not leave carbon residues or other debris in the area to contaminate the same and thus prevent effective formation of a strong hermetic seal of brazing material thereto.

What is claimed is as follows:

1. In a process of making a mechanically-strong, gas-impermeable metal-to-ceramic seal using a brazing metal, the step including (1) applying upon selected areas of a cleaned ceramic article to which brazing metal is to be bonded a coating of a paintable mixture comprising powdered metal of a particle size capable of passing through an approximately 325 mesh screen, a polymeric organic binder in an amount between about 1 and 5 percent by weight based on the weight of said powdered metal, and sufficient volatile organic solvent vehicle to render said mixture paintable, said powdered metal ingredient including powdered active metal, said polymeric organic binder being depolymerizable at elevated temperatures into volatile components which volatilize at said elevated temperature in a non-oxidizing environment without carbonizing, said powdered active metal being selected from the group consisting of titanium, zirconium, hafnium, vanadium, tantalum, molybdenum, tungsten, and mixtures thereof, (2) heating the coated ceramic article in a non-oxidizing vacuum environment maintained at a pressure less than $5 \times 10^{-4}$ mm. of Hg to a temperature at which the binder of said coating depolymerizes while removing volatile components of said depolymerized binder and any residual volatile organic solvent vehicle in said coating from said environment, and thereafter (3) further heating said coated ceramic article in said environment in the presence of brazing metal to a peak temperature between approximately 100 and 300° C. above the temperature at which said brazing metal initially fluidizes, said brazing metal being in such position with respect to the coated active metal on said ceramic article that said brazing metal on melting will intimately contact coated active metal on said ceramic article and bond to said ceramic.

2. In a process of making a mechanically-strong, gas-impermeable metal-to-ceramic seal using a brazing metal, the steps including (1) applying upon selected areas of a cleaned ceramic article to which brazing metal is to be bonded a coating of a paintable mixture comprising powdered metal of a particle size capable of passing through an approximately 325 mesh screen a polymeric organic binder in an amount between about 1 and 5 percent by weight based on the weight of said powdered metal, and sufficient volatile organic solvent vehicle to render said mixture paintable, said powdered metal ingredient including powdered active metal of which at least a part consists of titanium powder, said polymeric organic binder being depolymerizable at elevated temperatures into volatile components which volatilize at said elevated temperatures in a non-oxidizing environment without carbonizing, said powdered active metal being characterized by exhibiting a strong affinity at elevated temperatures for liquid brazing metals and for refractory ceramics, (2) juxtaposing a surface of a shaped metal piece with the coating on said ceramic article, (3) positioning brazing metal in contiguous relationship to the coating on said ceramic article, said brazing metal having a fluidus temperature between about 650° C. and 1400° C., (4) heating the assembled elements in an non-oxidizing vacuum environment maintained at a pressure below about $5 \times 10^{-4}$ mm. of Hg to a temperature at which the binder of said coating depolymerizes while removing volatile components of said polymerized binder and any residual volatile organic solvent vehicle in said coating from said environment, and thereafter (5) further heating said assembled elements in said environment to a peak temperature between approximately 100 and 300° C. above the temperature at which said brazing metal initially fluidizes, thereby to form a bond between said metal piece and said ceramic by the action of said brazing metal melting and flowing into the space between the juxtaposed surface of said metal piece and the coated active metal on said ceramic article.

3. In a process of making a mechanically-strong, gas-impermeable metal-to-ceramic seal using a brazing metal, the steps including (1) applying upon selected areas of a cleaned ceramic article to which brazing metal is to be bonded a coating of a paintable mixture comprising powdered metal of a particle size capable of passing an approximately 325 mesh screen, a polymeric organic binder in an amount between about 1 and 5 percent by weight based on the weight of said powdered metal, and sufficient volatile organic solvent vehicle to render said mixture paintable, said powdered metal ingredient including a powdered active metal and a powdered brazing metal, said polymeric organic binder being depolymerizable at elevated temperatures into volatile components which volatilize at said elevated temperatures in a non-oxidizing environment without carbonizing, said powdered active metal being selected from the group consisting of titanium, zirconium, hafnium, vanadium, tantalum, molybdenum, tungsten, and mixtures thereof, said powdered brazing metal having a liquidus temperature between approximately 650 and 1400° C., (2) heating the coated ceramic article in a non-oxidizing vacuum environment maintained at a pressure below about $5 \times 10^{-4}$ mm. of Hg to a temperature at which the binder of said coating depolymerizes while removing volatile components of said depolymerized binder and any residual volatile organic solvent vehicle in said coating from said environment, and thereafter (3) further heating said coated ceramic article in said environment to a temperature between about 100 and 300° C. above the temperature at which said powdered brazing metal initially fluidizes, thereby to cause said brazing metal in fluid condition to intimately contact powdered active metal in said coating and to be bonded to said ceramic.

References Cited in the file of this patent
UNITED STATES PATENTS

| | | |
|---|---|---|
| 2,566,339 | Klinker | Sept. 4, 1951 |
| 2,570,248 | Kelley | Oct. 9, 1951 |
| 2,722,496 | Hosmer | Nov. 1, 1955 |
| 2,724,892 | Knochel et al. | Nov. 29, 1955 |
| 2,739,375 | Coxe | Mar. 27, 1956 |
| 2,770,033 | Zarth | Nov. 13, 1956 |
| 2,807,082 | Zambrow et al. | Sept. 24, 1957 |
| 2,820,534 | Hume | Jan. 21, 1958 |
| 2,835,967 | Umblia | May 27, 1958 |
| 2,857,663 | Beggs | Oct. 28, 1958 |

UNITED STATES PATENT OFFICE
CERTIFICATE OF CORRECTION

Patent No. 3,063,144                         November 13, 1962

Hayne Palmour III

It is hereby certified that error appears in the above numbered patent requiring correction and that the said Letters Patent should read as corrected below.

Column 2, line 58 and column 3, line 45, for "deploymerized" read -- depolymerized --; column 3, line 73, for "he" read -- the --; column 5, line 17, for "adhearing" read -- adhering --; line 28, for "componets" read -- components --; same column 5, line 60, for "step" read -- steps --; column 6, line 23, after "screen" insert a comma; line 41, for "an" read -- a --; same column 6, line 45, for "polymerized" read -- depolymerized --.

Signed and sealed this 27th day of August 1963.

(SEAL)
Attest:

NEST W. SWIDER                         DAVID L. LADD
Attesting Officer                      Commissioner of Patents